Aug. 11, 1959    A. K. MOSEMAN ET AL    2,898,691
ANIMAL DRIER
Filed July 31, 1957
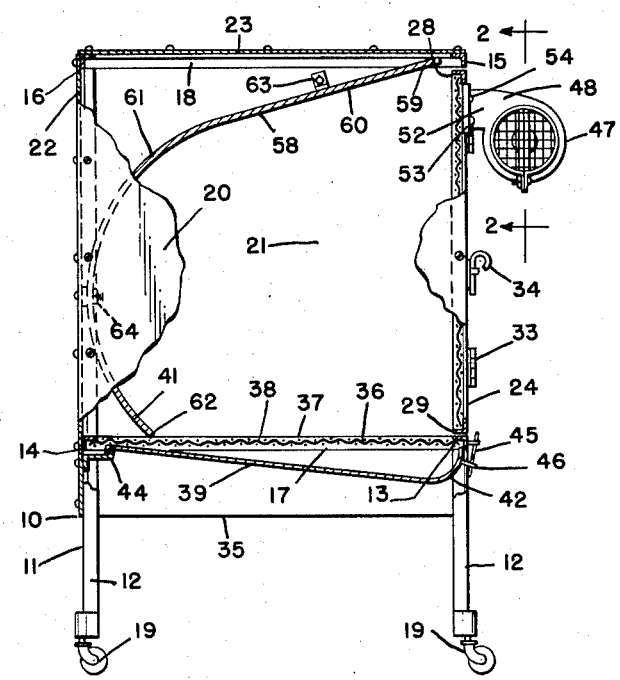
FIG. 1
FIG. 2
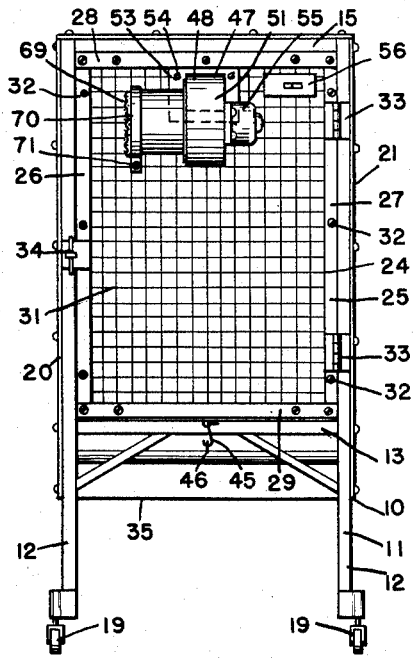
FIG. 3
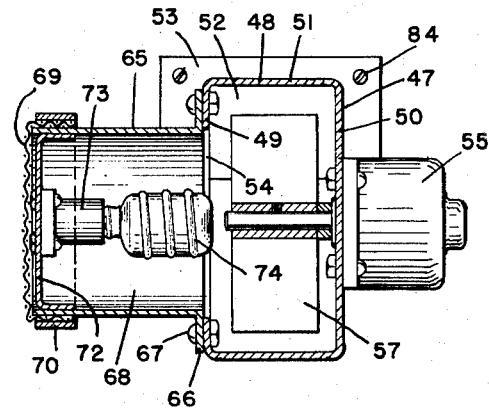
INVENTORS
AMOS K. MOSEMAN AND
ALBERT B. CUMMINGS
*Caswell & Lagaard*
ATTORNEYS

2,898,691
ANIMAL DRIER

Amos K. Moseman, Minneapolis, and Albert B. Cummings, Navarre, Minn.; said Cummings assignor to said Moseman Application July 31, 1957, Serial No. 675,453

9 Claims. (Cl. 34—231)

The herein disclosed invention relates to animal driers and has for an object to provide a cabinet in which a newly washed animal may be placed and by means of which warm air may be circulated about the animal to quickly and effectively dry the same.

Another object of the invention resides in constructing the cabinet with a top, a back, and side walls and open at the front, and in providing a reticulate closure for the front of the cabinet movably connected to permit of opening and closing the same for placement and removal of the animal to be dried.

Another object of the invention resides in providing a blower attached to said closure and serving to blow heated air into the upper portion of the cabinet and to force the air outwardly of the cabinet through said closure.

Another object of the invention resides in providing a reticulate floor at the lowermost portion of the cabinet on which the animal is placed, said floor being spaced above the lower ends of the side walls of the cabinet.

Another object of the invention resides in providing a curved baffle in the cabinet and against which the air from the blower impinges the baffle serving to direct the air downwardly and forwardly and against the animal to circulate the air about the same.

Another object of the invention resides in providing a second baffle situated below the floor of the cabinet and having a rear portion inclining forwardly and downwardly and in further providing said baffle with a curved portion at the forward end of the same extending upwardly and engaging said floor near the forward portion of said floor, said second baffle serving as a pan and bottom for the cabinet.

A feature of the invention resides in constructing said second baffle removable to permit of being conveniently removed for cleaning.

Another object of the invention resides in providing a heater in conjunction with the blower for heating the air directed against the animal.

Other objects of the invention reside in the novel combination and arrangement of parts and in the details of construction hereinafter illustrated and/or described.

In the drawings:

Fig. 1 is a side elevational view of an animal drier illustrating an embodiment of the invention and with portions cut away to show the construction thereof.

Fig. 2 is a fragmentary cross-sectional view taken on line 2—2 of Fig. 1.

Fig. 3 is a front elevational view of the invention.

The invention consists of a cabinet 10 which includes a framework 11 constructed of angle-shaped frame members. This framework comprises four legs 12 which are connected together intermediate their ends at the front of the cabinet by means of a cross frame member 13 and at the rear of the cabinet by means of a cross frame member 14. These cross frame members are bolted, or welded, or otherwise secured to the legs 12 intermediate the ends thereof. At the upper portions of said legs are provided similar cross frame members 15 and 16 which are attached to said legs in the same manner as the frame members 13 and 14. Extending in a front to back direction are longitudinal frame members 17 which are secured to the legs 12 at the localities of support for the cross frame members 13 and 14. Similarly, other longitudinal frame members 18 are attached to the legs 12 at the upper portions thereof and in the planes of the frame members 15 and 16. Casters 19 are mounted at the lower ends of the legs 12 and serve to support the entire drier for easy movability.

The cabinet 10 further consists of side walls 20 and 21 which are bolted to the longitudinal frame members 17 and 18 and to the legs 12. In a similar manner, a back 22 is likewise bolted to the cross frame members 14 and 16 and to the legs 12. A top 23 is similarly bolted to the upper frame members 15, 16 and 18. The side walls, back and top of the cabinet are preferably constructed of a composition cellulose material which is more or less water proof and which has sufficient insulating characteristics to prevent discomfort to the animal when coming in contact with the same.

As will be noted, the cabinet 10 is open at the front and may be closed by means of a closure 24. This closure consists of a frame 25 constructed of angle-shaped material and which frame fits snugly within the open portion of the framework 11 at the front of the cabinet. The frame 25 consists of vertical frame members 26 and 27, an upper frame member 28 and a lower frame member 29. These frame members are secured together at the corners and have overlying the same a reticulate panel 31 which may be constructed of coarse wire cloth and which is attached to the frame 11 by means of screws 32. The closure 24 is hingedly connected to the cabinet 10 by means of hinges 33 which are secured to the vertical frame member 27 of frame 25 and which are also secured to one of the legs 12 of the framework 11. A latch 34 carried by the frame member 26 and cooperating with the juxtaposed leg of the framework 11 retains the closure in closed position.

Mounted within the cabinet 10 and near but above the lower edges 35 of the walls 20 and 21 and the back 22 is a floor 36. This floor is constructed from a reticulate panel 38 which is similar to the panel 31 and which is attached to a frame 37 comprising the members 13, 14 and 17.

Below the floor 36 is a pan 39 which is spaced below the floor 36 and which slopes downwardly and forwardly of the floor toward the front of the cabinet. This pan at its rearward edge 41 lies in close proximity to the floor 36. At the forward end of said pan is provided an upturned curved baffle 42, the upper edge 43 of which meets the floor 36. The rearward edge 41 of the pan 39 is supported on a rest 44 which is attached to the back 22 of the cabinet. The forward portion is supported by means of a hook 45 pivoted to the cross frame member 13 of the framework 11 and engageable with an eye 46 attached to the baffle 42. The pan 39 extends completely across the cabinet from the wall 20 to the wall 21.

Mounted within the cabinet 10 and between the side walls 20 and 21 is a baffle 58. This baffle has one end 59 situated in proximity to the top 23 of the cabinet at the forward portion of the same. The said baffle is constructed with a forward portion 60 which inclines rearwardly and downwardly. The said baffle is further formed with a curved portion 61, the upper part of which extends rearwardly and downwardly and follows along the back 22 and the lower part of which extends downwardly and forwardly. The lower edge 62 of this baffle engages the floor 36 forwardly of the back 22. This baffle is secured in position by means of clip angles 63 which are bolted to the side walls 20 and 21 and to the portion 60 of said baffle and by means of bolts 64 which pass through the curved portion 61 of the baffle and through the back 22.

Mounted on the closure 24 is a blower 47. This blower consists of a housing 48 having spaced side walls 49 and 50 and an intervening wall structure 51. In the side wall 49 is formed an inlet opening 54. The side walls and wall structure are provided with a discharge outlet 52 and at the locality of said outlet are formed with a flange 53 encircling said outlet. Bolts 84 extending through said flange and through the closure 24 attach the blower to the same. Air circulated by said blower leaves the blower through the discharge outlet 52 and is blown through the interstices of the panel 21 and into the interior of the cabinet. Attached to the wall 50 is an electric motor 55 which is operated by means of an electric switch 56 also attached to the panel 31. The shaft of the motor 55 has attached to it a blower rotor 57 which draws air through the inlet 54 and discharges the same through the outlet 52 when the motor is energized.

Attached to the wall 49 of the blower housing 48 is a case 65 having a flange 66 extending about the same. This flange is secured to the wall 49 of said blower housing by means of bolts 67. The case 65 provides a passageway 68 which communicates with the inlet 54 to the blower. The case 65 is open at the front and has extending across the same a reticulate closure 69 which is secured to said case by means of an encircling band 70. A bolt 71 draws the ends of this band together and clamps the closure in position. Extending across the outer end of the case 65 is a bracket 72 which has attached to it an electric socket 73. A heating element 74 is screwed in this socket and is centrally located within the passageway 68.

The manner of operation of the invention is as follows. The animal, after being washed and dried with a towel, is placed into the cabinet upon the floor 36 and facing the front of the cabinet. The closure 24 is then closed and latched with the latch 34. Motor 55 is now started and the blower 47 draws air through the closure 69, through the passageway 68, and into the interior of the housing 48. The blower rotor 57 forces the air through the discharge outlet 52 and into the interior of the cabinet 10 and along the portion 60 of the baffle 58. At the same time, the heater 74 is energized and the air discharged into the cabinet is raised to a suitable temperature. The air then follows the curved portion 61 of the baffle and is next discharged through the floor 36 and against the pan 39. The air finally engages the baffle 42 and is forced back into the interior of the cabinet. The air thus makes a substantially complete circle about the animal resting on the floor 36 and causes drying of the animal from all sides. The air on entering the center of the cabinet is discharged through the portion of the panel 31 of closure 24 beneath the blower 46. When the animal is dry, the motor and heater are shut off and the door opened and the animal removed.

The advantages of the invention are manifest. Animals can be thoroughly dried with the instant invention in an exceedingly short time due to the fact that the warm air is circulated about the animal on all sides. All of the operating mechanism is attached to the door and none of it within the cabinet so that there are no parts with which the animal can come in contact and which would interfere with its movement in the cabinet or cause harm to it. When the closure for the cabinet is opened, the cabinet is completely empty, and insertion and removal of the animal into and from the cabinet is readily accomplished. The device is extremely simple in construction and may be readily fabricated at a nominal expense.

Changes in the specific form of the invention, as herein described, may be made within the scope of what is claimed without departing from the spirit of the invention.

Having described the invention, what is claimed as new and desired to be protected by Letters Patent is:

1. An animal drier comprising a cabinet having a top, a back, and sides, and open at the front, a reticulate closure for the front, movable from an open to a closed position, a reticulate floor in said cabinet, a pan disposed below and spaced from said floor, said pan having a portion inclining downwardly from the rear end of said pan and toward the front of the cabinet, a curved baffle at the front of said inclining portion leading upwardly toward said floor, means for directing air into said cabinet at the upper portion thereof and means within said cabinet directing the air downwardly and through said floor and along said pan, the air on reaching said baffle being directed upwardly and back into the interior of the cabinet proper and leaving said cabinet through said closure.

2. An animal drier comprising a cabinet having a top, a back, and sides, and open at the front, a reticulate closure for the front, movable from an open to a closed position, a reticulate floor in said cabinet, a pan disposed below and spaced from said floor, said pan having a portion inclining downwardly from the rear end of said pan and toward the front of the cabinet, a curved baffle at the front of said inclining portion leading upwardly toward said floor, means for directing air into said cabinet through said reticulate closure at the upper portion thereof and means within said cabinet directing the air downwardly and through said floor and along said pan, the air on reaching said baffle being directed upwardly and back into the interior of the cabinet proper and leaving said cabinet through said closure.

3. An animal drier comprising a cabinet having a top, a back, and sides, and open at the front, a reticulate closure for the front, movable from an open to a closed position, a reticulate floor in said cabinet, a pan disposed below and spaced from said floor, said pan having a portion inclining downwardly from the rear end of said pan and toward the front of the cabinet, a curved baffle at the front of said inclining portion leading upwardly toward said floor, a blower disposed outwardly of said cabinet and blowing air into the upper portion of said cabinet and means within said cabinet directing the air downwardly and through said floor and along said pan, the air on reaching said baffle being directed upwardly and back into the interior of the cabinet proper and leaving said cabinet through said closure.

4. An animal drier comprising a cabinet having a top, a back, and sides, and open at the front, a reticulate closure for the front, movable from an open to a closed position, a reticulate floor in said cabinet, a pan disposed below and spaced from said floor, said pan having a portion inclining downwardly from the rear end of said pan and toward the front of the cabinet, a curved baffle at the front of said inclining portion leading upwardly toward said floor, a blower mounted on said closure and disposed outwardly of said cabinet and blowing air into the upper portion of said cabinet and means within said cabinet directing the air downwardly and through said floor and along said pan, the air on reaching said baffle being directed upwardly and back into the interior of the cabinet proper and leaving said cabinet through said closure.

5. An animal drier comprising a cabinet having a top, a back, and sides, and open at the front, a reticulate closure for the front, movable from an open to a closed position, a reticulate floor in said cabinet, a pan disposed below and spaced from said floor, said pan having a portion inclining downwardly from the rear end of said pan and toward the front of the cabinet, a curved baffle at the front of said inclining portion leading upwardly toward said floor, a second baffle within said cabinet having an inclined forward portion inclining downwardly and rearwardly from the front end of the top of the cabinet and a curved portion extending downwardly from said forward portion and curving first toward the back and then forwardly and terminating substantially at the level of said floor, a blower disposed at the upper end of said cabinet and directing air from the exterior of the cabinet along the inclined portion of said second baffle, the air so directed following along the curved portion of the baffle, through the reticulate floor and being thereafter directed by said pan and second named baffle through said floor and back into the cabinet proper and finally being discharged from the cabinet through said reticulate closure.

6. An animal drier comprising a cabinet having a top, a back, and sides, and open at the front, a reticulate closure for the front, movable from an open to a closed position, a reticulate floor in said cabinet, a pan disposed below and spaced from said floor, said pan having a portion inclining from the rear end of said pan and toward the front of the cabinet, a curved baffle at the front of said inclining portion leading upwardly toward said floor, a second baffle within the cabinet having a curved portion disposed at the rear of the cabinet and formed with a part extending forwardly and upwardly and another part extending forwardly and downwardly, said last named part terminating substantially at the level of said floor, a blower disposed at the upper end of said cabinet and directing air from the exterior of the cabinet against the upwardly extending part of the second named baffle, then along the downwardly extending part of the baffle, through the reticulate floor and being thereafter directed by said first named baffle through said floor and into the cabinet proper and finally discharged from the cabinet through said reticulate closure.

7. An animal drier comprising a cabinet having a top, a back, and sides, and open at the front, a reticulate closure for the front, movable from an open to a closed position, a reticulate floor in said cabinet, a pan disposed below and spaced from said floor, said pan having a portion inclining from the rear end of said pan and toward the front of the cabinet, a curved baffle at the front of said inclining portion leading upwardly toward said floor, a second baffle within the cabinet having a curved portion disposed at the rear of the cabinet and formed with a part extending forwardly and upwardly and another part extending forwardly and downwardly, said last named part terminating substantially at the level of said floor, a blower disposed at the upper end of said cabinet and directing air from the exterior of the cabinet against the upwardly extending part of the second named baffle, then along the downwardly extending part of the baffle, through the reticulate floor, and means for directing the air back through the floor and into said cabinet proper and finally discharging the air from the cabinet through said reticulate closure.

8. An animal drier comprising a cabinet having a top, a back and sides and open at the front, a reticulate closure for the front movable from an open to a closed position, means forming a bottom for said sabinet, a reticulate floor in said cabinet disposed above said bottom, a blower attached to said closure and disposed exteriorly of the cabinet at the upper portion of the same, a baffle within said cabinet having an upper portion inclining downwardly toward the rear of the cabinet and against which the entire discharge from the blower is directed, said baffle having a lower portion inclining downwardly toward the front of the cabinet and terminating at said floor at a position intermediate the forward and rearward edges thereof and receiving the air from the first named portion of said baffle and directing it downwardly and through said reticulate floor.

9. An animal drier comprising a cabinet having a top, a back, and sides, and open at the front, a reticulate closure for the front, movable from an open to a closed position, a reticulate floor in said cabinet, a baffle within the cabinet having a concave curved portion disposed at the rear of the cabinet and formed with a part extending forwardly and upwardly and meeting the top of the cabinet at the forward edge thereof and another part extending forwardly and downwardly, said last named part terminating substantially at the level of said floor and intermediate the forward and rearward edges thereof, a blower disposed at the upper end of said cabinet and directing air from the exterior of the cabinet against the upwardly extending part of said baffle, then along the downwardly extending part of said baffle, and means for directing the air leaving said baffle in a rearward direction into the interior of the cabinet and finally discharging it from the cabinet through said reticulate closure.

References Cited in the file of this patent

UNITED STATES PATENTS

| | | |
|---|---|---|
| 1,470,242 | Overton | Oct. 9, 1923 |
| 1,533,480 | Stricker | Apr. 14, 1925 |
| 2,608,003 | Tucker | Aug. 26, 1952 |